No. 820,276. PATENTED MAY 8, 1906.
A. N. WIENS.
SELF BINDING HARVESTER.
APPLICATION FILED DEC. 28, 1904.

Witnesses
H. A. Robinette
G. Ayres

Inventor
Aron N. Wiens.
By Marion & Marion
Attorneys.

UNITED STATES PATENT OFFICE.

ARON N. WIENS, OF WINKLER, CANADA.

SELF-BINDING HARVESTER.

No. 820,276.  Specification of Letters Patent.  Patented May 8, 1906.

Application filed December 28, 1904. Serial No. 238,694.

*To all whom it may concern:*

Be it known that I, ARON N. WIENS, farmer, a British subject, and a resident of Winkler, in the Province of Manitoba, in the Dominion of Canada, have invented a new and useful Improvement in Self-Binding Harvester-Machines—to wit, an invention which I call a "twine tension"—of which the following is a specification.

My invention relates to tension devices, especially adapted for use in self-binding harvesters; and it consists in the constructions, combinations, and arrangements herein described and claimed.

An object of my invention is to provide a durable construction which shall act with certainty to maintain an unvarying tension on the twine, thereby eliminating all danger of breakage and entanglement of the twine.

A further object of my invention is to provide an improved construction in which the twine will be automatically guided and maintained in proper position relative to the tension device, thereby insuring a uniform tension.

Figure 1:
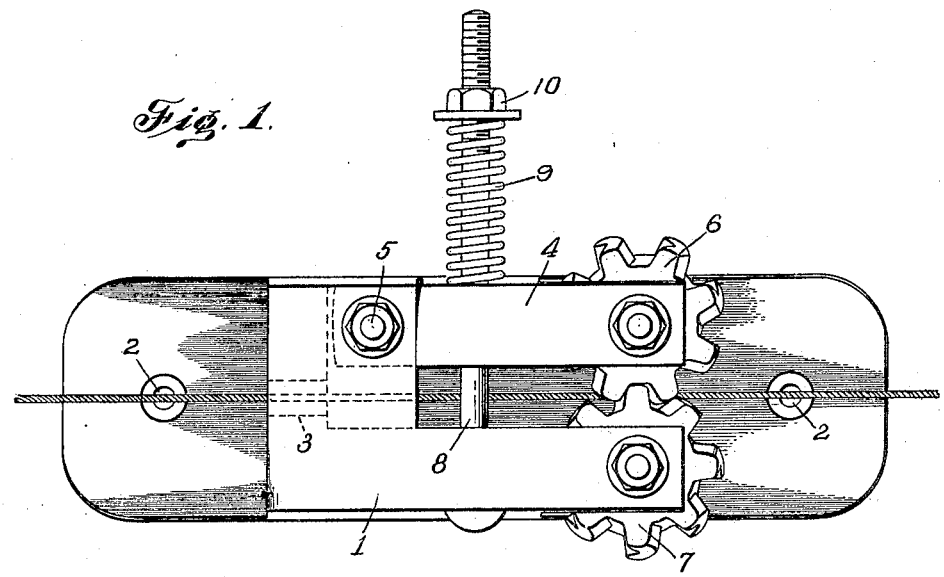
Figure 2:
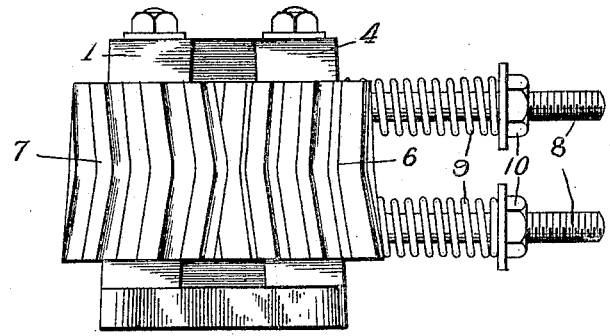

In the accompanying drawings, forming a part of this application, and in which similar reference-symbols indicate corresponding parts in both views, Figure 1 is a plan view illustrating an embodiment of my invention, and Fig. 2 is a front elevation of the construction shown in Fig. 1.

Referring to the accompanying drawings, 1 indicates a bracket adapted to be secured to the bottom of the packer-deck of a self-binding harvester in position to lead the twine in a direct line from the twine-box to the needle. When so positioned, the bracket is secured to the bottom of the packer-deck by bolts inserted in the openings 2, and the twine is led from the twine-box, through an opening 3 in said bracket, between a pair of intermeshing gears and onward to the needle.

A frame 4 is pivotally secured to the bracket 1 by a bolt 5 and carries at its outer end a V-toothed gear 6, arranged to intermesh with a similar gear 7, journaled in the bracket. These gears are preferably constructed slightly conical, with their smaller diameters upward, and are each provided with teeth inclined axially in both directions from substantially their mid portions. This construction of the teeth tends to maintain the twine constantly at the mid portion of the gears and acts to automatically return the twine to such position upon its accidental displacement in either direction therefrom. This form of tension-gear constitutes an important part of my invention, since it avoids all danger of breakage or entanglement of the twine by maintaining it in proper position relative to the tension device.

Bolts 8 are shown extending through the bracket 1 and frame 4 at a point intermediate of the pivotal support 5 of said frame and the gear 6, carried thereby. Springs 9, surrounding said bolts, are confined between the frame 4 and nuts 10, threaded on the bolts, thereby providing means for maintaining the gears in mesh with a yielding pressure, which can be varied by suitably adjusting the nuts 10 on their bolts. As shown especially in Fig. 1, the springs 9 engage the frame 4 at points adjacent to its fulcrum 5, thus permitting the advantageous employment of short heavy springs for maintaining the usual pressure between the intermeshing gears.

Having thus described my invention, what I claim as new, and desire to secure by Letters Patent, is—

1. A tension device comprising a pair of intermeshing V-toothed gears, and means for directing a cord therebetween, substantially as described.

2. A tension device comprising a pair of intermeshing V-toothed gears, means for directing a cord therebetween, and means for yieldingly maintaining said gears in mesh, substantially as described.

3. A tension device comprising a bracket provided with a guide-aperture for directing a cord, a frame pivotally supported on said bracket, a pair of intermeshing V-toothed gears journaled, respectively, in said bracket and frame with their pitch-circles substantially in the line of said guide-aperture, and yielding means for maintaining said gears in mesh, substantially as described.

Dated at Morden this 10th day of December, A. D. 1904.

ARON N. WIENS.

Witnesses:
WILLIAM GEORGE MACKENZIE,
ANNIE RANKIN McLAREN.